United States Patent
Watanabe et al.

[11] Patent Number: 5,920,678
[45] Date of Patent: *Jul. 6, 1999

[54] ROBOT TEACHING METHOD

[75] Inventors: Atsushi Watanabe; Tomoyuki Terada; Shinsuke Sakamoto, all of Yamanashi, Japan

[73] Assignee: Fanuc LTD, Yamanashi, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/502,359

[22] Filed: Jul. 14, 1995

[30] Foreign Application Priority Data

Jul. 15, 1994 [JP] Japan ................................. 6-185134

[51] Int. Cl.$^6$ ......................................................... B25J 9/00
[52] U.S. Cl. ................................................................. 395/90
[58] Field of Search ............................... 395/90, 80, 83, 395/87; 318/568, 572, 573, 568.1, 568.13, 568.11; 364/513, 191, 192, 167.01; 219/124.34; 701/301

[56] References Cited

U.S. PATENT DOCUMENTS

| | | | |
|---|---|---|---|
| 4,338,672 | 7/1982 | Perzley et al. | 364/513 |
| 4,613,803 | 9/1986 | Hasegawa et al. | 318/568 |
| 4,626,756 | 12/1986 | Inaba et al. | 318/573 |
| 4,737,697 | 4/1988 | Maruo et al. | 318/568 |
| 4,757,459 | 7/1988 | Lauchnor et al. | 364/513 |
| 4,841,430 | 6/1989 | Nakagawa et al. | 364/167.01 |
| 4,843,566 | 6/1989 | Gordon et al. | 364/513 |
| 4,912,383 | 3/1990 | Takeyama et al. | 318/568.11 |
| 4,998,050 | 3/1991 | Nishiyama et al. | 318/568.1 |
| 5,003,237 | 3/1991 | Kimura | 318/572 |
| 5,057,995 | 10/1991 | Mizuno et al. | 364/192 |
| 5,243,266 | 9/1993 | Kasagami et al. | 318/568.1 |
| 5,371,836 | 12/1994 | Mitomi et al. | 395/80 |
| 5,461,700 | 10/1995 | Kimura et al. | 395/80 |
| 5,479,078 | 12/1995 | Karakama et al. | 318/568.13 |
| 5,485,552 | 1/1996 | Mizuno et al. | 395/99 |
| 5,495,410 | 2/1996 | Graf | 364/191 |
| 5,582,750 | 12/1996 | Hamura et al. | 219/124.34 |
| 5,596,683 | 1/1997 | Kasagami et al. | 395/83 |
| 5,600,759 | 2/1997 | Karakama | 395/87 |
| 5,608,618 | 3/1997 | Kosaka et al. | 364/167.01 |

OTHER PUBLICATIONS

Delson et al., Robot programming by human demonstration: The use of human variation in identifying obstacle free trajectories, Proceedings 1994 IEEE International conference on Robotics and Automation, pp. 564–571, May 13, 1994.

Baumgartner et al., An autonomus vision based mobile robot, IEEE transactions on Automatic control, pp. 493–502, Mar. 1994.

*Primary Examiner*—Paul R. Lintz
*Assistant Examiner*—Sanjiv Shah
*Attorney, Agent, or Firm*—Staas & Halsey, LLP

[57] ABSTRACT

While jog feeding, if the robot can be moved safely without interference or collision with others, the data on jog feeding path is accumulated in an external memory device. And a safe region in which the robot can move without interference or collision can make from some accumulated paths in the robot axial space and stored. When start point and end point for the desired path are specified, one path, which links the start point and the end point and is composed of such safe regions, is found. Then the robot positions are taught as positions corresponding to the path.

2 Claims, 7 Drawing Sheets

F I G. 4
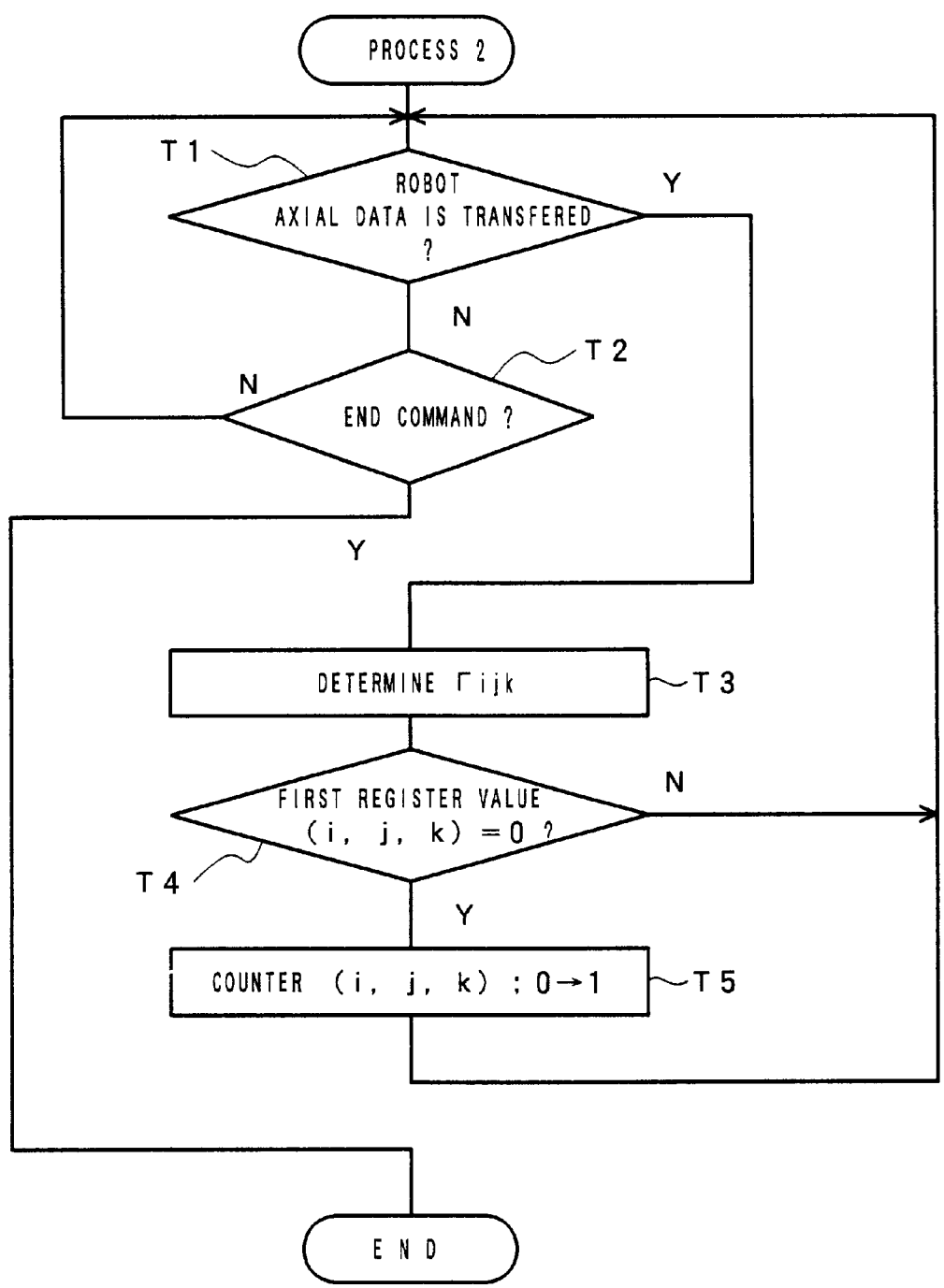

FIG. 5

| * | ○ | * | ○ | ○ | ○ | ○ | * | * | * |
|---|---|---|---|---|---|---|---|---|---|
| ○ | ○ | ○ | ○ | ○ | * | * | * | * | * |
| ○ | ○ | ○ | ○ | ○ | ○ | ○ | ○ | ○ | * |
| * | ○ | * | * | * | * | * | ○ | * | * |
| * | ○ | ○ | ○ | ○ | ○ | ○ | ○ | * | * |

FIG. 6

| * | 3 | * | 5 | 6 | 7 | 8 | * | * | * |
|---|---|---|---|---|---|---|---|---|---|
| 1 | 2 | 3 | 4 | 5 | * | * | * | * | * |
| S→1 | 2 | 3 | 4 | 5 | 6 | 7 | 8 | * |   |
| * | 2 | * | * | * | * | * | 8 | * | * |
| * | 3→4→5→6→E | | | | 10 | 9 | * | * |   |

FIG. 7

| * | 3 | * | 5 | * | * | * | * | * | * |
|---|---|---|---|---|---|---|---|---|---|
| 1 | 2→3→4→5→6 | | | | | * | * | * | * |
| S→1 | * | * | * | ⑦ | 8 | 9 | * | * |   |
| * | * | * | * | * | * | * | 10 | * | * |
| * | * | * | * | * | E | * | 11 | * | * |

ROBOT TEACHING METHOD

BACKGROUND OF THE INVENTION

1. Field of the Invention

The present invention relates to a method of teaching a moving path to an industrial robot (hereinafter referred to simply as robot) used for automating and saving labor in factories and the like, and more particularly to a method of teaching the robot a moving path capable of avoiding collision by making use of moving path data in jog feed of the robot.

2. Description of the Related Art

The robot teaching method hitherto employed most widely is the so-called teaching playback method. In this system, the operator manipulates the teaching pendant to move the robot actually by the jog feed, and the robot position corresponding position selected as teaching point is sequentially stored in the robot as position data.

Therefore, to keep the teaching point positions or the robot trace between teaching points (usually specified by line or arc) free from collision with peripheral devices, the operator must judge and select the positions of teaching points carefully. Or, if the risk of collision was found in a play back operation after teaching, it was required to touch up or add the position data.

In such traditional method, checking for the possibility of collision of robot positions and path between robot positions mostly depended on the judgement by the operator, and even for a skilled operator, teaching is not easy. Besides, due to wrong operation in jog feed for teaching or play back operation after teaching or inadequate teaching, the possibility of inducing collision or other collision accident of the robot and peripheral device was not a little.

If the teaching operation is started from the state where robot moving speed (expressed as override value) is set low, and the teaching operation is progressed by gradually raising the moving speed (override) while confirming the robot path, in order to avoid collision accident securely, the operation time is extended.

OBJECTS AND SUMMARY OF THE INVENTION

It is hence a primary object of the invention to solve the problems of the traditional method, and to provide a robot teaching method capable of teaching a robot moving path low in the risk of collision without imposing heavy burden to the operator.

In a certain working environment (layout situation of peripheral devices, etc.), when the operator executes jog feed of the robot for the purpose of teaching, as far as collision accident by wrong operation (including dangerous state just before collision) does not occur, the robot path passing through the process of jog feed is judged to be a safe robot moving path. Therefore, in repeatedly executed jog feed, in the robot moving path in which the robot has passed safely, by accumulating the combinations of the robot axis variables θ1, θ2, θ3, . . . θN (N: number of robot axes), a set of points on the robot axial space can be obtained. This point is called "safety point" here. It also can be considered that a point on the robot axis space where the safety point is provide very closely is a robot position free from collision.

Accordingly, the region around each safety point is regarded as an axial space region where the robot may be present almost safely, and if combination of such region can be determined on the robot axial space, the robot moving path passing in such region is judged to be a safe path. In the present invention, the region in the robot axial space determined on the basis of such concept is called robot passable axial space region, and while teaching, the robot moving path is selected as far as possible so as to pass through this robot passable axial space region.

To determine the robot passable axial space region, practically, the robot axial space is divided into multiple region elements by volume, and the region elements confirmed to be safe are accumulated in every jog feed execution of the robot. The safety may be confirmed when the robot safely passes through the region element in jog feed.

When such region elements confirmed to be safe are accumulated to a certain extent, it is expected that a continuous region with a considerable expanse be formed on the robot axial space. Therefore, by proper software processing, the path passing in this continuous region (that is, the robot passable axial space region) is compiled automatically, and by storing the axial value data or position data converted values representing the path in the robot, the path can be taught to the robot. If there are some paths passing the robot passable axial space region, it is preferred to select the shortest path length between the start point and end point of the path in the axial space.

Incidentally, if the position on the robot axial space corresponding to a desired path end point is in a region not confirmed to be safe (out of robot passable axial space region), the moving path close to the desired path end point is determined within the robot passable axial space region, and further ahead the operator adds the teaching point in the process of reaching the robot at the desired path end by jog feeding, so that the conventional method may be combined.

It is desirable that the robot axial space to be set in accordance with the invention is such a space as determined by all axial variables relating to the robot position. However, as the existing region of the robot is considerably limited, for example, by determining the axial values of three basic axes (θ1 to θ3), the robot axial space may be set using only some of robot axes, such as basic three axes, by considering the processing capacity of the robot control device and associated information processing device (personal computer, etc.) and the storage capacity of memory.

BRIEF DESCRIPTION OF THE DRAWINGS

The foregoing and other objects and feature of the invention will become apparent from the following description of preferred embodiments of the invention with respect to the accompanying drawings, in which:

FIG. 4 is a flow chart showing the outline of processing executed at the personal computer side when accumulating jog feed path data.

FIG. 5 is a two-dimensional expression of register value distribution of a first register brought about by a considerable number of times of jog feed.

FIG. 6 is a diagram for explaining the process up to step W10 by referring to the example of FIG. 5.

FIG. 7 is a two-dimensional expression of the case where safety of a part of the path from the present position (start point of the path) to target position (end point of the path) is not confirmed.

DETAILED DESCRIPTION OF THE PREFERRED EMBODIMENTS

Figure 1:
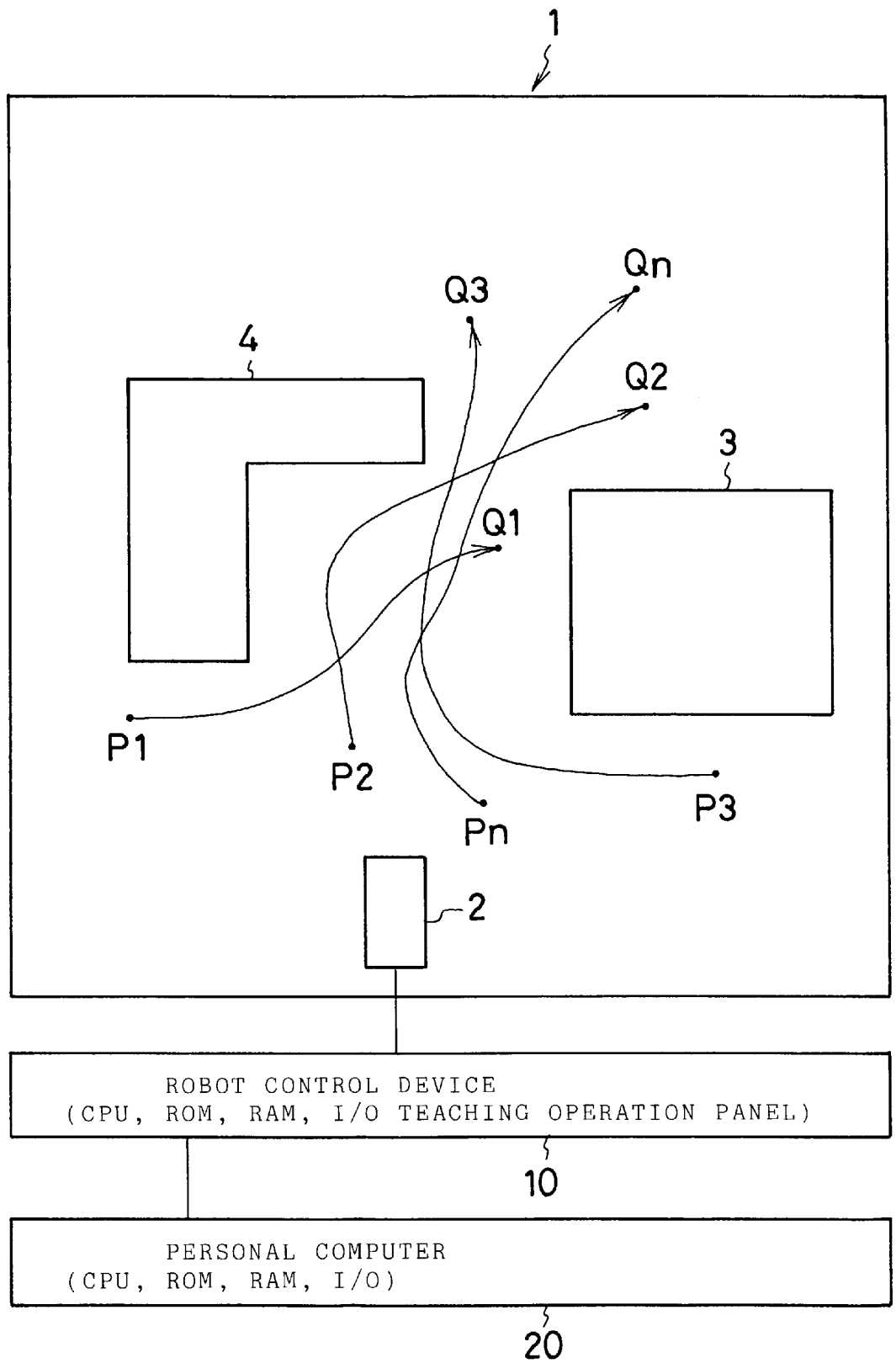
FIG. 1 shows a system configuration used in execution of the invention, together with a two-dimensional working space drawn schematically.

FIG. 1 shows the system configuration used in execution of the invention, together with a two-dimensional working space drawn schematically.

In FIG. 1, reference numeral 1 represents the concept of working space, which is expressed as a two-dimensional region for the sake of convenience. Reference numeral 2 is a robot installed in the working space 1, and is connected to a robot control device 10. The robot control device 10 has an ordinary constitution, comprising CPU, ROM, RAM, input and output device (I/O), and teaching pendant 11. The robot control device 10 is connected to an external information processing device (herein, personal computer) 10 through the input and output device (I/O). The personal computer 10 has an ordinary constitution comprising CPU, ROM, RAM, input and output device (I/O) and others, and as required, hard disk, printer (not shown) and others are connected through the input and output device (I/O).

In the embodiment, as the robot axial space, a space determined by basic three axes (axial variables $\theta1$ to $\theta3$) is set, and the sequence and procedure of executing the robot moving path teaching not causing collision with the peripheral devices 3, 4 existing in the working space 1 by using the system configuration are explained sequentially below.

[1] Setting of robot axial space and infinitesimal volume element

Herein, the robot axial space is defined as the orthogonal three-axis space of basic three axes ($\theta1$, $\theta2$, $\theta3$). On this robot axial space, consequently, the robot moving range is set by using the minimum values [$\theta1$ (min), $\theta2$ (min), $\theta3$ (min); $\geq 0$ degree], and maximum values [$\theta1$ (max), $\theta2$ (max), $\theta3$ (max); $\leq 360$ degree]. That is, the robot operating range is a region determined by the operating section ranging from $\theta1$ (min) to $\theta1$ (max) for the $\theta1$ axis; the operating section ranging from $\theta2$ (min) to $\theta2$ (max) for the $\theta2$ axis; and the operating section ranging from $\theta3$ (min) to $\theta3$ (max) for the $\theta3$ axis.

By dividing these robot operating regions into M equal portions about each axis of $\theta1$, $\theta2$, $\theta3$, the robot operating region is subdivided into $M \times M \times M$ ($=M^3$) infinitesimal volume elements (blocks). If the operating section of each axis divided into M portions are numbered from 1 to M from the minimum value to the maximum value, then one infinitesimal volume element of the i-th for axis $\theta1$, j-th for axis $\theta2$, and k-th for axis $\theta3$ (where i, j, k=1, 2, 3, ... M) may be designated by the address (i, j, k). Hereinafter, the infinitesimal volume element specified by the address (i, j, k) is expressed as $\lceil$ijk.

Figure 2:
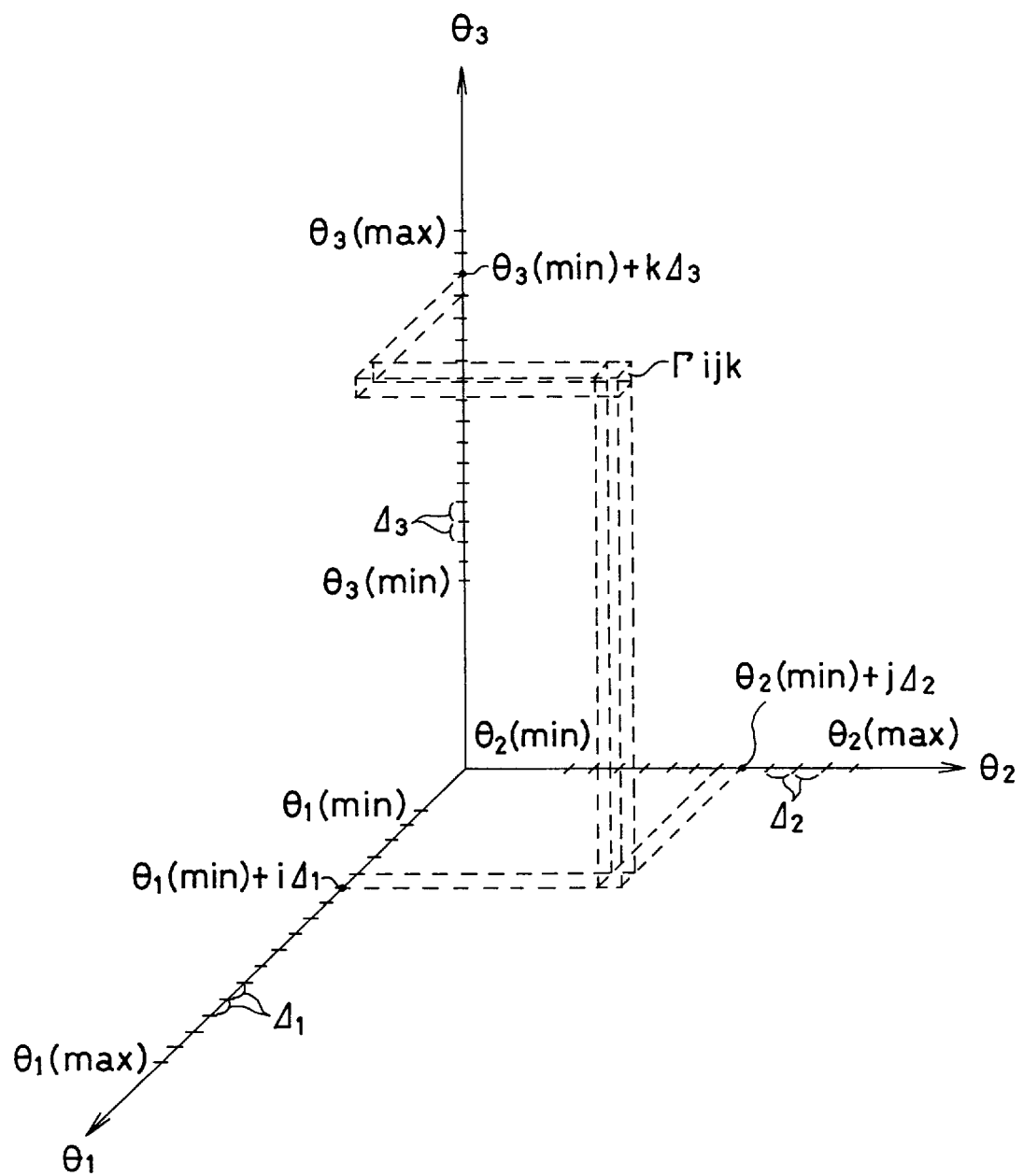
FIG. 2 is a diagram for explaining the infinitesimal volume element ⌈ijk set on the robot axial space.

When supposing:

$\Delta1 = (\theta1$ (max)$-\theta1$ (min))/M, $\Delta2 = (\theta2$ (max)$-\theta2$ (min))/M, $\Delta3 = (\theta3$ (max)$-\theta3$ (min))/M, the infinitesimal volume element $\lceil$ijk is, as shown in FIG. 2, a region specified by the section ranging from $\theta1$ (min)+(i-1) $\Delta1$ to $\theta1$ (min)+i$\Delta1$ for axis $\theta1$, the section ranging from $\theta2$ (min)+(j-1) $\Delta2$ to $\theta2$ (min)+j$\Delta2$ for axis $\theta2$, and the section ranging from $\theta3$ (min)+(k-1) $\Delta3$ to $\theta3$ (min)+k$\Delta3$ for axis $\theta3$.

The size of the division number M for determining the size of each infinitesimal volume region is desired to be set such that one side of the infinitesimal volume element in the robot axial space may correspond to the maximum interval which would allow two adjacent paths to be regarded as intersecting or connecting with each other. Besides, for the purpose of nearly equalizing the length of each side of the infinitesimal volume element, the axis $\theta1$ may be divided into M1, the axis $\theta2$ into M2, and $\theta3$ into M3, depending on the operating range of each axis.

[2] Accumulation of jog feed path data

Figure 3:
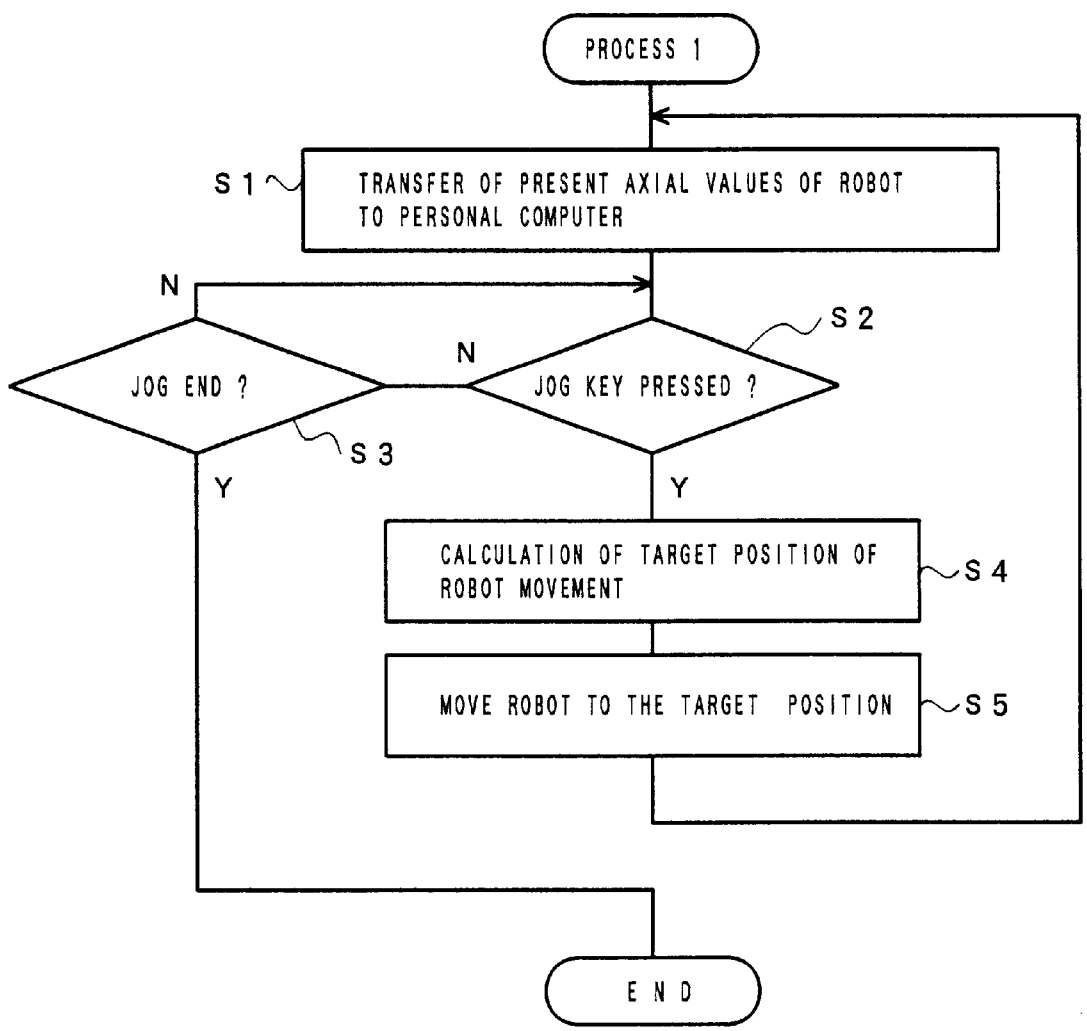
FIG. 3 is a flow chart showing the outline of processing executed at the robot control device side when accumulating jog feed path date.

After setting the robot axial space and infinitesimal volume elements, accumulation of jog feeding path data is started in the state where all values of the first register (i, j, k) is cleared to the initial value 0. FIG. 1 shows examples of jog feed paths P1 to Q1, P2 to Q2, ..., Pn to Qn. Every time these jog feeds are executed, process 1 (robot control device 10) and process 2 (personal computer 20) shown in the flow chart in FIGS. 3 and 4 are executed.

At the robot control device 10 side, the robot axial values in jog feed (basic three axial values) are transferred to the personal computer (step S1). When the jog key pressing by the operator is detected (Yes at step S2), the destinated position is calculated according to the pressed jog key (step S4), and the robot is moved to the destinated position (step S5). Returning to step S1, the robot axial values (basic three axial values) are transferred to the personal computer.

When the job key pressing is interrupted or terminated (No at step S2), presence or absence of jog end command is judged at step S3. If No, returning to step S2, the jog key pressing state is checked again. Thereafter, the same process is repeated, and the process 1 is terminated when judged to be Yes at step S3.

On the other hand, at the personal computer 20 side, it is first ready for waiting for transfer of the robot axial value data from the robot control device 10 (step T1). Receiving data, advancing to step T3, each axial value is divided by the division number M, and the corresponding $\lceil$ijk is determined. The register value of the first register specified by the address (i, j, k) is checked (step T4).

If the register value is 1, it means safety of robot passing has been already confirmed for $\lceil$ijk, and that the robot passable attribute be given, and hence the operation returns to step T1 to wait for next data transfer. On the other hand, if the register value is 0, it means that safety of robot passing has just been confirmed for the first time for $\lceil$ijk, and hence the register value is changed from 0 to 1 to provide $\lceil$ijk with the robot passable attribute, thereby returning to step T2.

Such processing is repeated until the processing end command (transferred from the robot control device 10) is confirmed at step T2. Thus, the processes 1 and 2 are executed on every jog feed, and the register value of the first register corresponding to $\lceil$ijk newly confirmed to be robot passable is changed to 1. FIG. 5 shows a two-dimensional expression of register value distribution of the first register brought about by a considerable number of jog feeds. In FIG. 5, mark "O" indicates the register value 1 (already confirmed that robot is passable), and mark "*" indicates the register value 0 (not yet confirmed that robot is passable).

[3] Teaching of robot path

Figure 8:
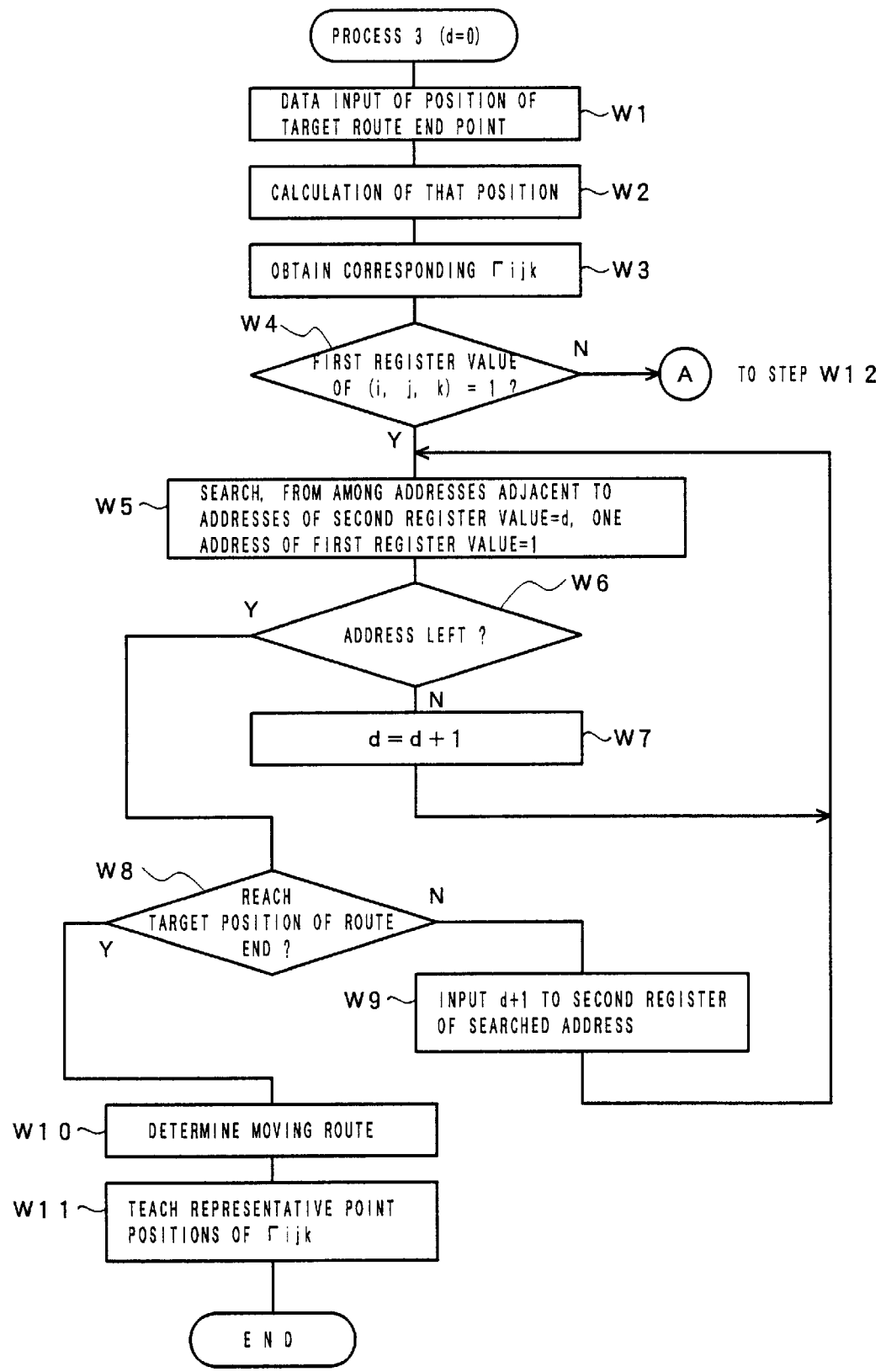
FIG. 8 and FIG. 9 are flow charts explaining the outline of processing of execution of teaching of the robot path.
Figure 9:
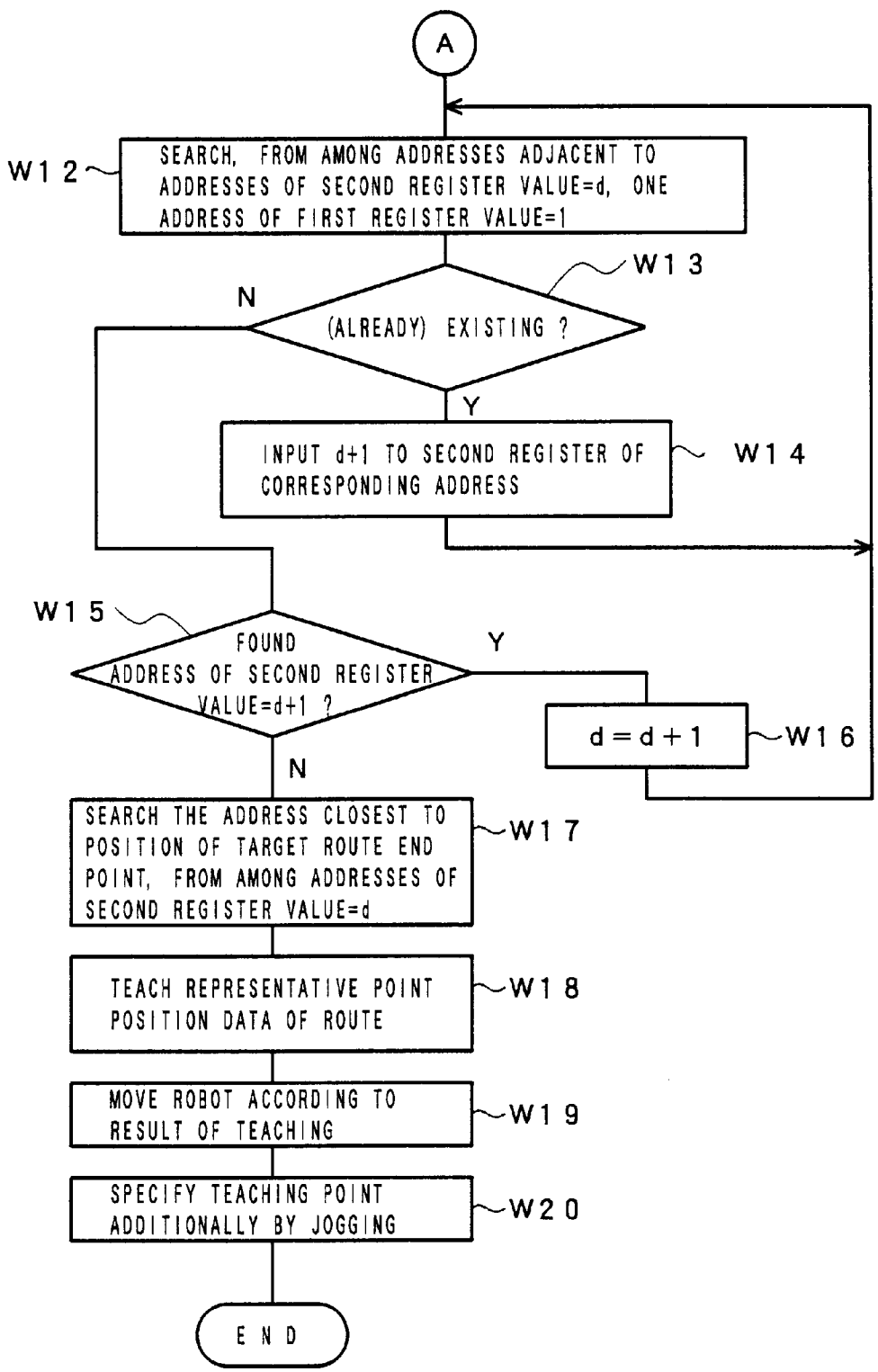

When judged that sufficient data is accumulated after a considerable number of jog feeds, teaching of robot path is executed according to process 3 shown in the flow charts in FIGS. 8 and 9. The process 3 is started in the state where index d expressing the path length on the robot axial space from the start point of the path is initially at d=0. It is assumed that the second register value of the address of $\lceil$ijk to which each axial value corresponding to the robot path start point position (present position) belongs is initially set to "0" and all other second register values are initially set to γ (counting saturated value) respectively. Moreover, the start point of the path position (present position) is assumed to be selected at a position corresponding to the axial value region where the first register value is already 1.

First, when the position data of the target path end point is entered in the robot control device 10 (step W1), the axial values of basic three axes are calculated by inverse operation (step W2).

Then, the corresponding ⌈ijk is determined (step W3), and it is checked whether the first register value of the address (i, j, k) is 1 or not (step W4). The first register value=1 means that the safety (robot passable) has been confirmed for the position of the desired end point of the path, and the first register value=0 means that the safety (robot passable) has not been confirmed yet.

The former case is explained first. If determination is Yes at step W4, one address (⌈ijk) in which the second register value is 1 is selected from among the addresses adjacent to the address where the second register value is d. When such address is discovered, skipping to step W8, if the searched address does not correspond to the position of the desired end point of the path further moving to step W9, the second register value of the searched address is set to d+1, and the operation returns to step W5. When the address (⌈ijk) in which the first register value is 1 is no longer find out the addresses adjacent to the address where the second register value is d, it is judged No at step W6, advancing to step W7, the path length index d is increased by 1, thereby returning to step W5.

In this way, steps W5 to W9 are repeated, soon reaching ⌈ijk (address) corresponding to the end point of the path; and it is judged Yes at step W8, and the teaching path is determined (step W10). The hitherto process is shown in FIG. 6 in correspondence to the case in FIG. 5. In FIG. 6, symbol S indicates the address or infinitesimal volume element ⌈ijk corresponding to the start position of the path, and E, corresponding to the end point of the path. According to the distance from the start point S, d values are indicated as 1, 2, 3, . . . . In this example, at d=6, the end point E is found as the adjacent address. Hence, in FIG. 6, the path indicated by arrow (→) is adopted as the teaching path.

More specifically, at step W11, the axial value data or position data representing each ⌈ijk of the path of E→6→ . . . ,→1→S (data other than the basic three axes are determined by interpolating the axial values of each position of start point and end point) are taught, and processing is terminated.

Next, referring to FIG. 7 and the flow chart of FIG. 9, processing in the case of determination No at step W4 (where safety has not been confirmed for the desired end point of the path is described below. In this case, advancing from step W4 to step W12, one address (⌈ijk) in which the first register value is 1 is searched from among the addresses adjacent to the addresses where the second register value is d. When such address is discovered, advancing from step W13 to step W14, the second register value of the searched address is set to d+1, and the operation returns to step W12.

When the address satisfying the conditions at step W12 is no longer discovered, the operation advances from step W13 to step W15. Searching the address in which the second register value is d+1, if found, the path length index d is increased by 1 at step W16, thereby returning to step W12.

By repeating such process, any adjacent address satisfying the conditions at step W12 is not discovered some time later, and then it is judged No at step W15. This indicates as shown in FIG. 7, that a path for approaching or reaching the ⌈ijk or address (i, j, k) corresponding to the position of the target path end point E is stopped halfway. Accordingly, at step W17, from among the addresses where second register value is d or less, the one closest to the position of the target path end point is searched. In the example in FIG. 7, such a address corresponds to the column of 7 enclosed with "O".

At step W18, taught is the axial value data or position data representing each ⌈ijk of the path (path indicated by arrow in the example in FIG. 7) reaching the address searched at step W17. Other data than basic three axes are determined by interpolating the axial values at each position of start point and end point. On the basis of this teaching, the robot is moved to the taught position corresponding to the address searched at step W17 (step W19). From this position (the column of 7 enclosed with "O" in the case of FIG. 7) to the position of the target path end point (indicated by double arrow in the case of FIG. 7), additional teaching is done in a manner such that the robot can reach the position of the path end point (E in FIG. 7) by jog feed operation according to the operator's judgement (step W20), thereby finishing the process 3.

Incidentally, most of the steps in each process explained so far may be generally executed at either side of the robot control device or external information processing device (personal computer). It is also evident that the method of the invention can be executed if the robot axial space is defined by more axial variables than the basic three axes.

According to the invention, after executing a certain number of jog feed operations, it is possible to teach automatically a robot path without executing jog feed for all or part of the robot path. Hence, the load of the operator required for path teaching of robot may be lessened significantly, and collision accidents due to malfunction or the like may be prevented and avoided.

What is claimed is:

1. A robot teaching method comprising the steps of:
   (a) dividing a movement range of a robot into a plurality of blocks and selecting a representative point for each of the plurality of blocks;
   (b) moving the robot within said moving range from a first position to a second position a plurality of times in safety without collision with others, and storing a block through which a moving path of the robot passes as a passable block in a memory;
   (c) selecting passable blocks from among the stored passable blocks which connect in series a block corresponding to a starting point to a block corresponding to an end point of a moving path, when the starting point and end point are set in any positions within said moving range of a robot; and
   (d) teaching the robot a moving path connecting said starting point, each of the representative points of selected passable blocks, and said end point.

2. A method of teaching a robot moving path extending from a start point to an end point corresponding to any position in a movement range, comprising the steps of:
   dividing the movement range into a plurality of blocks;
   moving the robot within the movement range a plurality of times and storing blocks, from the plurality of blocks, through which the robot moves without collision, as passable blocks;
   determining whether blocks adjacent to a first block corresponding to the start point are passable blocks and selecting an adjacent passable block as part of the moving path;

repeating the passable block determining step using the selected adjacent passable block as the first block, until no adjacent blocks are determined to be passable blocks, or until the blocks adjacent to the first block include a block corresponding to the end point; and teaching the robot the selected adjacent passable blocks as forming the moving path.

* * * * *